United States Patent [19]
Johnson et al.

[11] Patent Number: 5,701,824
[45] Date of Patent: Dec. 30, 1997

[54] WIRE ROPE TROLLEY

[75] Inventors: James W. Johnson, Hartford; Donald H. Hilliard, Mayville, both of Wis.

[73] Assignee: Hubbell Incorporated, Orange, Conn.

[21] Appl. No.: 647,108

[22] Filed: May 9, 1996

[51] Int. Cl.$^6$ .................................................. B61B 3/00
[52] U.S. Cl. .......................... 104/112; 105/148; 105/150; 403/331
[58] Field of Search .................... 104/89, 93, 106, 104/110, 112, 173.1, 126, 177; 105/148, 150, 151; 191/12 R; 403/49, 326, 331, 335, 336, 381

[56] References Cited

U.S. PATENT DOCUMENTS

| | | | |
|---|---|---|---|
| 3,704,350 | 11/1972 | Itoh | 105/151 |
| 3,802,351 | 4/1974 | Pascuzzi | 104/112 |
| 4,093,047 | 6/1978 | Wampfler | 191/12 R |
| 5,524,548 | 6/1996 | Fox | 104/89 |

FOREIGN PATENT DOCUMENTS 982130  12/1982  Russian Federation ............. 191/12 R

OTHER PUBLICATIONS

Gleason Reel *Econo Wire Catalog*, Wire Rope Festoon Kits, pp. 24–25, 1996.
Gleason Reel *Festoon Systems Wire Rope & C-Rail Catalog*, p. 5 approx. 1985, no date.
Wampfler, *Leitungswagen Und Zubehör Catalog*, pp. 210/215/8, 210/215/11 –210/215/13, 210/215/17 and 210/215/29.

*Primary Examiner*—Mark T. Le
*Attorney, Agent, or Firm*—Jerry M. Presson; David L. Tarnoff; Thomas P. Hilliard

[57] ABSTRACT

A trolley having a top member and a base member that are releasably coupled together without the use of a separate fastener. The top member has a top connecting portion with a top locking element, and the base member has a base connecting portion slidably engaging the top connecting portion. The base connecting portion has a base locking element hinged thereon and releasably engaging the top locking element for releasably locking the top and base members. To unlock the top and base members, and allow them to freely slide relative to one another, a screwdriver can be used to bias the base locking element away from the top locking element. The base member further has a portion for attaching a holding device. The top and base members define a through passageway that receives an elongated support therein and has rollers for allowing the trolley to move along the support.

21 Claims, 4 Drawing Sheets

FIG. 9
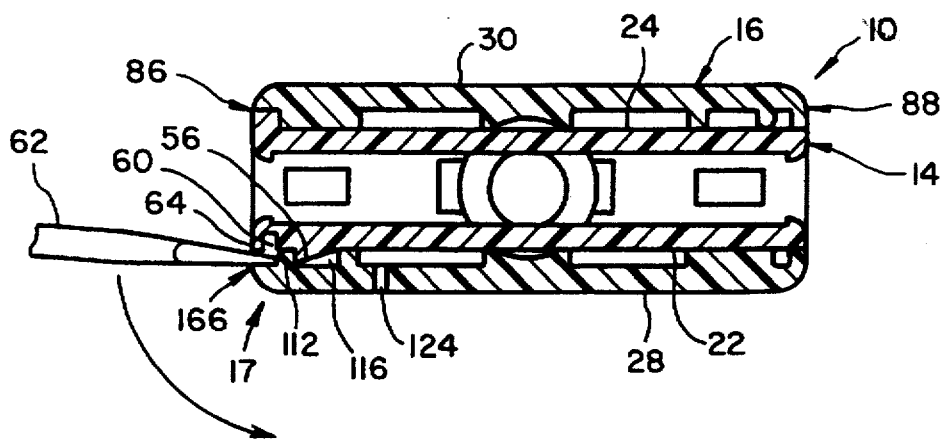
FIG. 10
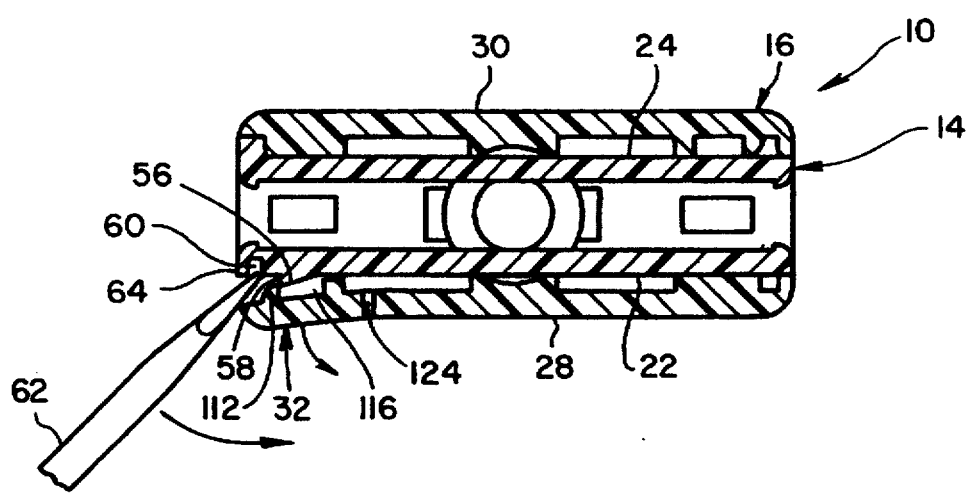
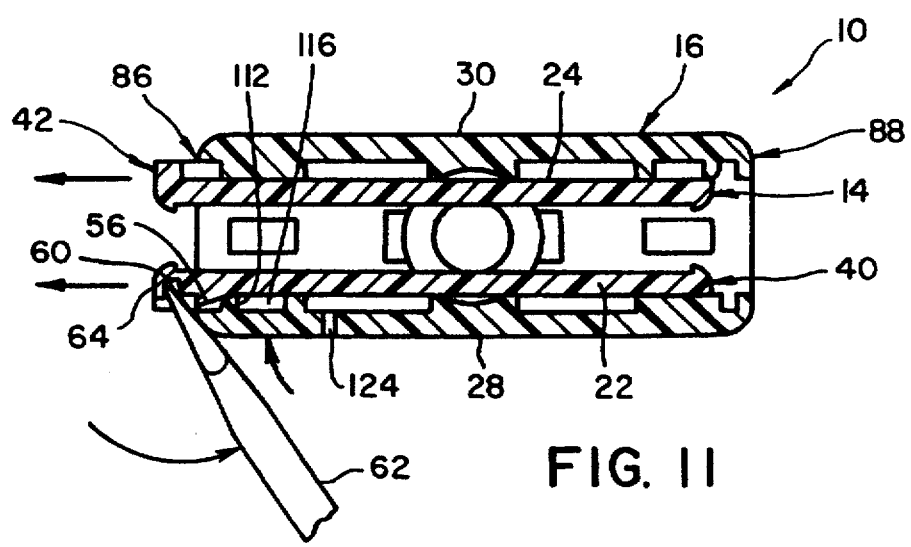
FIG. 11

WIRE ROPE TROLLEY

FIELD OF THE INVENTION

The present invention relates to trolleys that roll along a support while holding such things as tools, cables and hoses. More specifically, the invention relates to wire rope trolleys that are capable of being releasably attached to wire rope or another support by slidably engaging a top member of the trolley to a base member of the trolley and locking the members together without using a separate fastener.

BACKGROUND OF THE INVENTION

In many commercial settings, it is often necessary to extend conduits such as hoses, cables, and the like from a point of connection with an electrical or pneumatic source to a point of use at a location some distance from the source. To avoid maneuvering the conduit around machinery or other objects and to avoid the dangers associated therewith, it is desirable to extend the conduit overhead along a support line. Such a support line is commonly wire rope.

The conduit is generally maintained in a retracted, looped configuration adjacent the source. To facilitate extending the conduit along the support line from its retracted position to an extended position at a distant point of use, trolleys are commonly used. These trolleys roll along the support line while holding a portion of the conduit.

The portion of the conduit supported is typically a loop, and a holding device typically extends down from the trolley to support the loop. Multiple loops of the conduit are supported by multiple trolleys.

The trolleys of the prior art generally have a roller attached to two side elements by a bolt which extends through each side element and through the roller. The bolt is then fastened by a nut. The roller rotates on the bolt.

When it is desired to extend the conduit to a point of use a distance from the source, the conduit is pulled. Each trolley, supporting a loop of the conduit, moves along the support line until the conduit has reached its destination.

A major drawback of the prior art wire rope trolleys is the manner in which they are assembled and disassembled for placement on and removal from the support line. Since prior art wire rope trolleys have bolts connecting the trolley sides together and extending through the roller, it is necessary to assemble all four of these parts while reaching up to place the trolley on the overhead wire rope. Such an assembly is difficult, if not impossible for a single person to accomplish.

A single person using both hands cannot easily install the prior art wire rope trolleys due to the cumbersome nature of their assembly and the multitude of parts to be assembled.

Further complicating the assembly is the fact that the prior art trolleys are generally made from metal and are relatively heavy. Also, since bolts and nuts are utilized, tools are required to complete assembly.

When it is desired to remove prior art trolleys from the wire rope, and for installation on other supports, disassembly of the trolley is equally difficult.

Examples of prior art wire rope trolleys are disclosed in the Gleason Reel Corporation "FESTOON SYSTEMS Wire Rope and C-Rail" catalog, circa 1991, at page 5, and in the Wampfler 1979 trolley catalog.

SUMMARY OF THE INVENTION

Accordingly, an object of this invention is to provide a trolley, such as a wire rope trolley, that is relatively easy to assemble and disassemble.

Another object of this invention is to provide a trolley, such as a wire rope trolley, having a top and a base that are connected together by a snap-fit without the use of bolts, screws, or other separate fasteners.

Still another object of this invention is to provide a trolley, such as a wire rope trolley, that can be relatively easily assembled on a support, such as wire rope, without the use of any tools.

A further object of this invention is to provide a trolley, such as a wire rope trolley, that can be disassembled with the use of a single tool, preferably a screwdriver.

Yet another object of this invention is to provide a trolley, such as a wire rope trolley, that is lightweight, easily manufactured, durable, and strong.

The foregoing objects are basically obtained by providing a trolley comprising a top member having a top connecting portion with a top locking element; and a base member having a base connecting portion for slidably engaging with the top connecting portion, the base connecting portion having a base locking element releasably engaging the top locking element for releasably locking the top member to the base member, the base member further having a portion for attaching a holding device, the top and base members defining a through passageway for receiving an elongated support therein.

Other objects, advantages and salient features of the invention will become apparent from the following detailed description which, taken in conjunction with the annexed drawings, discloses a preferred embodiment of the invention.

BRIEF DESCRIPTION OF THE DRAWINGS

Referring to the drawings which form a part of this original disclosure:

FIG. 9 is a top plan view in section taken along line 9—9 of FIG. 3, showing the location of the tool required for disassembly of the top and base members of the trolley;

FIG. 10 is a top plan view in section similar to that of FIG. 9 but showing the tool releasing the top locking element from the base locking element by outwardly displacing the base locking element; and FIG. 11 is a top plan view in section similar to that of FIG. 10 but showing the tool position as the top and base members are disengaged.

DETAILED DESCRIPTION OF PREFERRED EMBODIMENT

Figure 1:
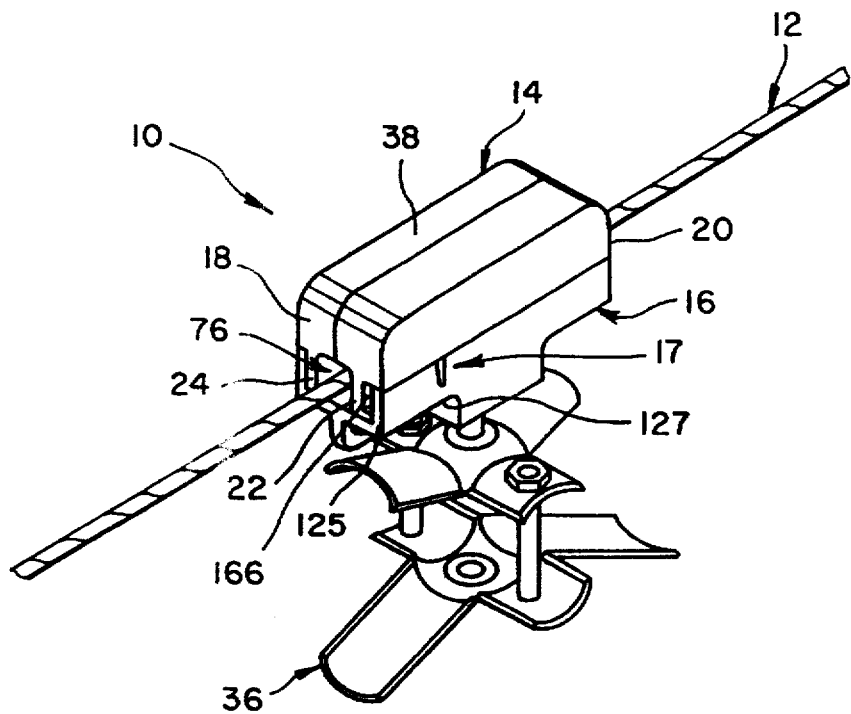
FIG. 1 is a perspective view of the trolley in accordance with the present invention illustrating the trolley in position on a supporting wire rope.
Figure 2:
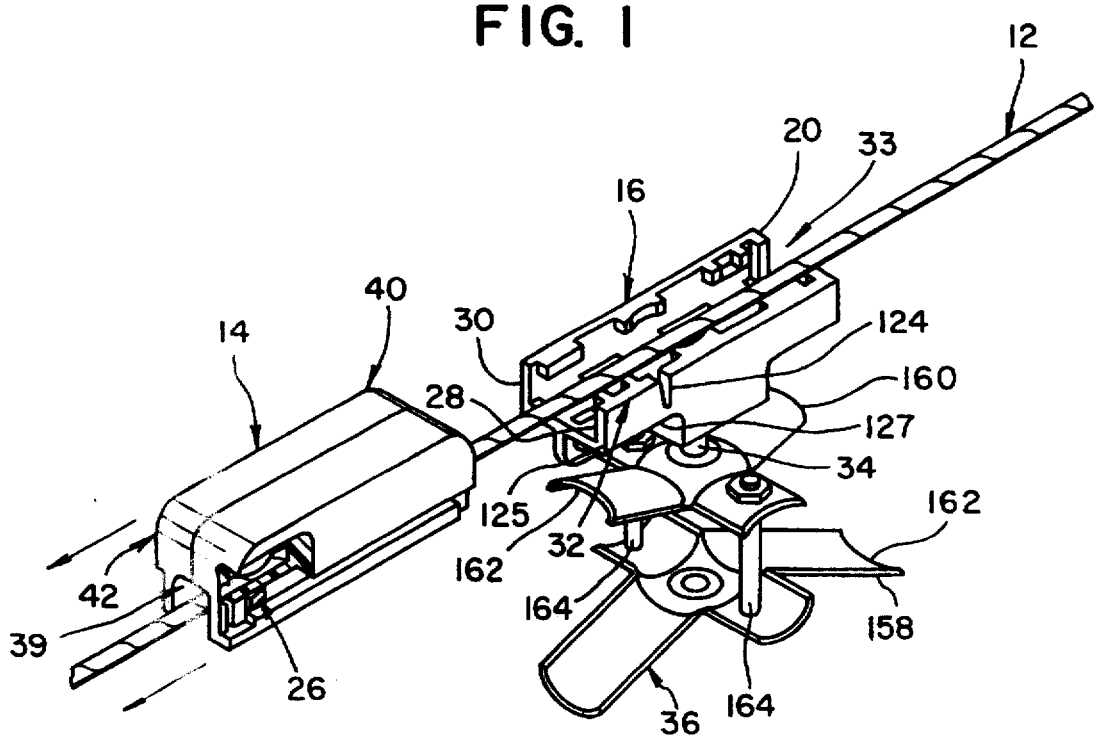
FIG. 2 is a perspective view similar to FIG. 1 in partial section showing the trolley having the top member disengaged from the base member, the top member showing in partial section the top member locking element.

Referring to FIGS. 1 and 2, a trolley 10 in accordance with the invention is shown attached to a support line 12, such as wire rope. Trolley 10 includes a top member 14 slidably engaged in a releasable manner with a base member 16. A locking assembly 17 releasably locks the top and base members 14 and 16 to each other. The locking assembly 17 comprises a top locking element 26 and a base locking element 32. The support line 12 extends through a through passageway 76 in the trolley 10. The through passageway 76 is formed by the top and base members 14 and 16. The support line 12 enters the passageway 76 through a first face 18 and exits through a second face 20. The trolley's ability to travel along the support line 12 is facilitated by rollers 78. The trolley 10 is capable of being attached to the support line 12 without the use of a separate fastener. Additionally, the trolley 10 can be removed from the support line 12 with the use of a tool such as a screwdriver 62 to unlock the locking assembly 17.

The top member 14 has a first top connecting flange or portion 22 and a second top connecting flange or portion 24. The first top connecting flange 22 has a top locking element 26 thereon.

Base member 16 has a first base connecting flange or portion 28 and a second base connecting flange or portion 30 which slidably engage flanges 22 and 24 of the top member 14. The first base connecting flange 28 has a base locking element 32 thereon which engages the top locking element 26. Base member 16 also has a platform 90. The base flanges 28 and 30 and the platform 90 form a U-shaped recess 33 within the base member 16. Base member 16 further has a fastener 34 attached thereto for supporting a bracket 36 which holds a loop of conduit, or a tool (not shown).

The top member 14 is elongated and has a body 38 with a downwardly opening U-shaped recess 39 therein along the length of the body. One end of the top member 14, along its longitudinal axis, is an inserting end 40 while the opposite end is a locking end 42. The manner of inserting and locking the top member 14 to the base member 16 will be described in detail below.

The body 38 of top member 14 has two flanges 22 and 24 which extend from a lower surface 44. As shown in FIGS. 3, 4, 7, and 8, the first top flange 22 and the second top flange 24 extend perpendicularly to lower surface 44, and parallel to the longitudinal axis of top member 14. Ribs 46 and 48 are attached to the ends of flanges 22 and 24 remote from the top member body 38 and perpendicular to the first and second top flanges 22 and 24. Ribs 46 and 48, in conjunction with the flanges 22 and 24, form first and second top channels 50 and 52 between first and second ribs 46 and 48 and lower surface 44.

Figure 3:
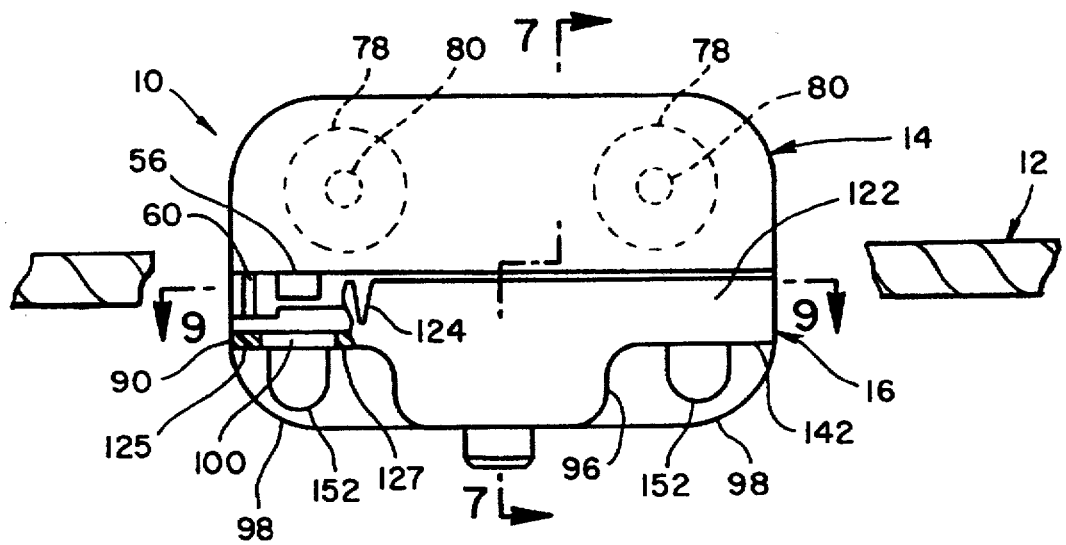
FIG. 3 is a side elevational view in partial section of the trolley in accordance with the present invention, illustrating the location of the wire rope, rollers, and locking elements.
Figure 4:
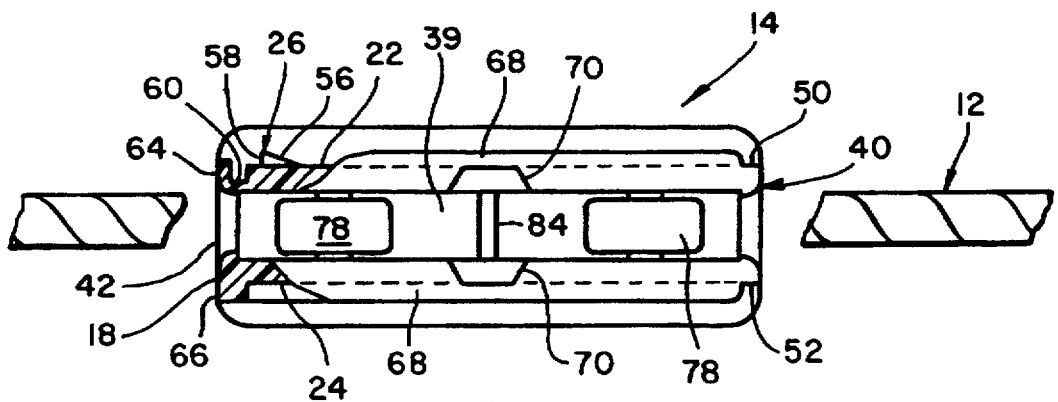
FIG. 4 is a bottom plan view in partial section of the top member of the trolley in accordance with the present invention.

Within the first top channel 50 is the top locking element 26, as shown in FIGS. 3 and 4, near the locking end 42 of top member 14. Top locking element 26 is a protrusion in the shape of a wedge which extends into first channel 50. Top locking element or wedge 26 has a ramp 56 which outwardly extends at an incline in the direction of the longitudinal axis of the top member 14. Wedge 26 has an end of greatest thickness towards the locking end 42 of top member 14. Wedge 26 also has a front section 58 extending from the thick end of ramp 56 to the first top flange 22 and perpendicular to the first top flange 22. Front section 58 of wedge 26 faces in the direction of the locking end 42 of the top member 14.

A rectangular releasing slot or element 60 is located in the first top channel 50 between the locking end 42 of the top member 14 and the wedge 26. The releasing slot 60 is sized to receive a tool, such as a screwdriver, 62 therein as will be described in greater detail below.

A releasing block 64 is also located in the first top channel 50 between the face 18 of the locking end 42 of the top member 14 and the releasing slot 60. The releasing block 64 provides a thickened support for the tool 62 placed in the releasing slot 60.

Second top flange 24, like the first top flange 22, extends perpendicularly from the top member lower surface 44 along the longitudinal axis of top member 14. At the end of the second top flange 24 remote from the top member body 38, rib 48 extends perpendicular to second top flange 24 forming a second top channel 52 between the second top rib 48 and the top member lower surface 44. Second top channel 52 extends along the length of the second top flange 24 from the inserting end 40 of the top member 14 to a stop element 66 positioned at the end of the channel 52 adjacent the face 18 of the locking end 42 of the top member 14 as shown in FIG. 4.

A bottom surface 68 of each of the top flanges 22 and 24 contains a recess 70 which is sized to receive the head 72 of the fastener 34 as shown in FIG. 4. The two recesses 70 allow an individual to press the head 72 of the fastener 34 into engagement with the sides of the recess 70 allowing the head 72 of the fastener 34 to be gripped while removing a bracket 36 or similar device from the trolley 10.

Figure 6:
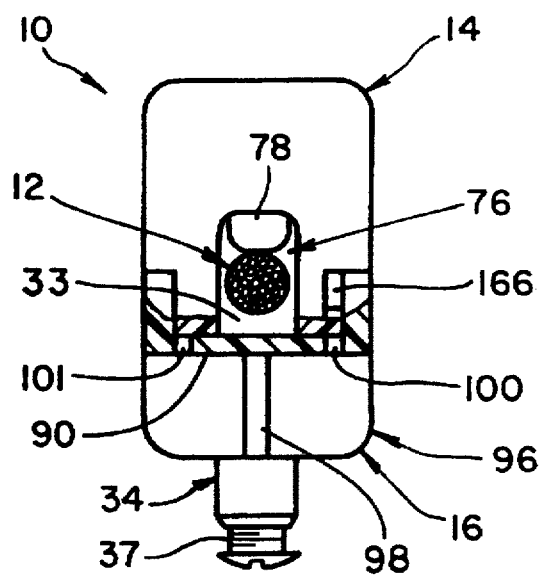
FIG. 6 is a front elevational view in partial section of the trolley in accordance with the present invention, illustrating the through passageway for the wire rope ahd the through slots.

As shown in FIGS. 1 and 6, the through passageway 76 is located between the flanges 22 and 24 of top member 14 and the platform 90 of the base member 16. The through passageway 76 is formed by the U-shaped recess 33 in the base member 16, and the U-shaped recess 39 in the top member 14. The through passageway 76 extends completely through top member 14 along its longitudinal axis from the face 20 of the inserting end 40 to the face 18 of the locking end 42. The passageway 76 is large enough to receive support line 12 as seen in FIGS. 6 and 7.

Figures 7, 8:
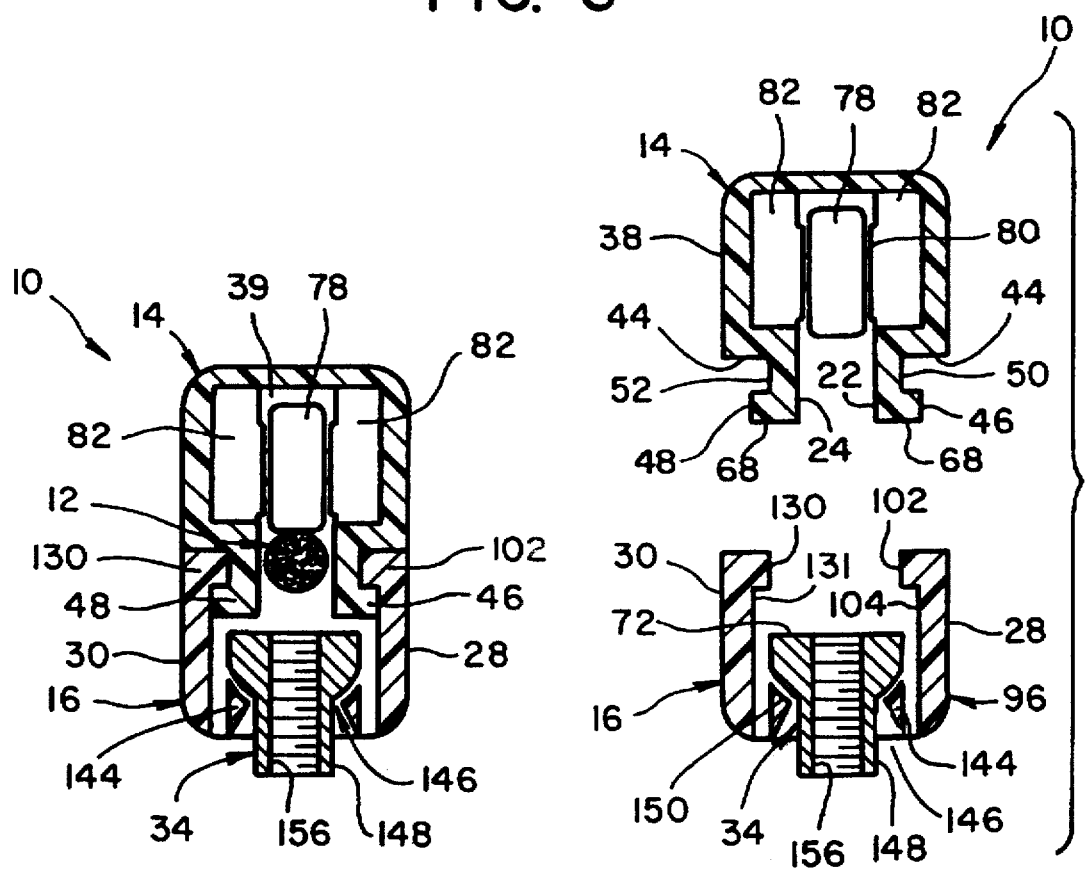
FIG. 7 is a front elevational view in section taken along line 7—7 of FIG. 3.
FIG. 8 is an exploded view of the trolley assembly as shown in FIG. 7.

As seen in FIGS. 3 and 6-8, top member 14 also contains two rollers 78 in the form of wheels which engage the support line 12 and allow the trolley 10 to move easily along the support line 12. Each of the rollers 78 rotates about an axle 80 which is perpendicular to the longitudinal axis of body 38 and which is supported by axle supports 82 formed integrally with the top member body 38 as shown in FIG. 7.

As shown in FIG. 6, the rollers 78 extend downwardly into the passageway 76, allowing the support line 12 to extend through the passageway 76 while engaging only the rollers 78. Although rollers 78 are shown in the form of wheels, any device which provides adequate movable contact between the support line 12 and the top member 14 may be used. The rollers 78 may be replaced with nonrolling elements. Preferably, the elements used will decrease friction between the trolley 10 and the support line 12 to facilitate movement of the trolley along the support line 12. The rollers 78 and axles 80 are preferably made of plastic.

As seen in FIG. 4, a stiffening wall 84 is located between the rollers 78 perpendicular to the longitudinal axis of the top member 14. The stiffening wall 84 extends completely across and further strengthens the top member 14.

As seen in FIGS. 1–3 and 5–8, the base member 16 has a profile similar to the top member 14. The base member 16 has a receiving end 86 and a stopping end 88. The receiving end 86 is the end at which the top member 14 is slided into the base member 16. The stopping end 88 is the end which limits the sliding of the top member 14 along the base member 16. The platform 90 extends along the length of the base 16. First and second base flanges 28 and 30 extend upward from the platform 90, as seen in FIGS. 3 and 6, while an attachment portion 96 with stiffeners 98 extends downward from the platform 90. The platform 90 contains three through slots 100 and 101 adjacent each of the first and second base flanges 28 and 30, respectively. The platform 90 also has two through slots 154 between the two base flanges 28 and 30.

First base flange 28 extends upwardly and perpendicularly to the platform 90. At the side of the first base flange 28 remote from the platform 90, a first base rib 102 is attached perpendicular to the first flange 28. The first base rib 102 is sized to fit snugly but slidably in the first top channel 50. A first base channel 104 is formed between the first base rib 102 and the platform 90. The first base channel 104 is sized to snugly but slidably receive the first top rib 46.

Figure 5:
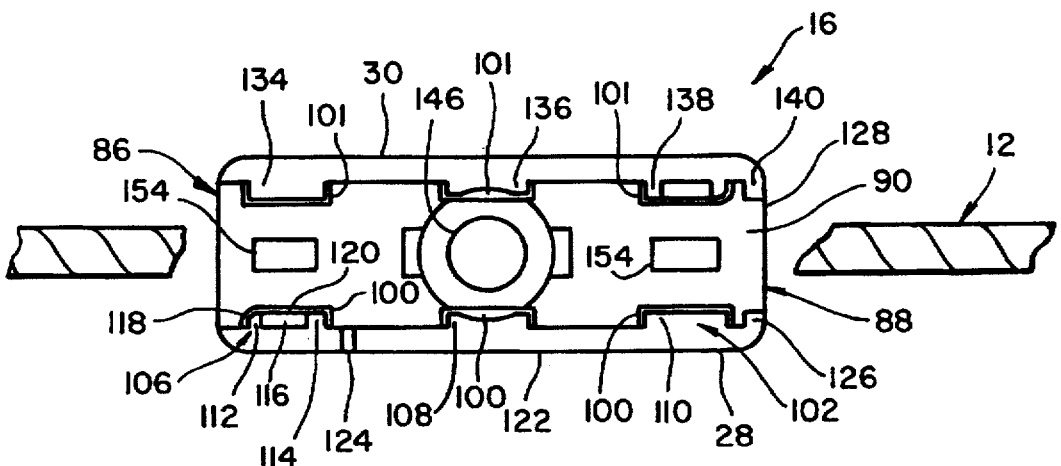
FIG. 5 is a top plan view of the base member of the trolley in accordance with the present invention.

The first base rib 102 as seen in FIG. 5 comprises three distinct rib sections 106, 108 and 110. A first locking rib section 106 is adjacent the receiving end 86, a second concave rib section 108 is midway along the first flange 28, and a third rib section 110 is adjacent the stopping end 88.

The locking rib section 106 has two spaced abutments 112 and 114 with a recess 116 therebetween. The abutment 112 closest the receiving end 86 of the base member has a bevelled surface 118 for easier engagement with the wedge 26 upon engagement of the top and base members 14 and 16. A floor 120 extends between the surfaces of the abutments 112 and 114 closest to the platform 90 to strengthen the abutments 112 and 114. However, the recess 116 remains large enough to receive the wedge 26 upon locking engagement of the top and base members 14 and 16. The concave rib section 108 also has dual functions since it also provides clearance for the inserted fastener 34.

Three through slots 100 are located in the platform 90 adjacent the first base flange 28 aligned with and below the three rib sections 106, 108 and 110. The perimeter of the slots 100 can be seen in FIG. 5. The shape of the through slots 100 is substantially the same but slightly larger than the rib sections 106, 108 and 110. The through slots 100 simplify the manufacturing of the base member 16.

The base locking element 32 is located at the receiving end 86 of the first base flange 28, is a portion of the first base flange 28 and is separated from a main portion 122 of the first base flange 28 by a vertical notch 124 as shown in FIG. 3. The notch 124 extends downwardly into the first base flange 28 to a point just short of the platform 90.

Referring to FIGS. 3 and 6, the through slot 100 opposite the locking rib section 106, and the notch 124 limit the area of connection between the locking element 32 and both the platform 90 and the main portion 122 of the first base flange 28. The area of connection between the locking element 32 and the platform 90 is a first living hinge 125 while the area of connection between the locking element 32 and the main portion 122 is a second living hinge 127. The living hinges 125 and 127 give the locking element 32 its ability to be moved from an original position to an outward biased position and then return to its original position. An appropriate force can outwardly displace the locking element 32 away from its original position, and the locking element 32 will return to its original position after the force is removed due to the inherent resiliency of the living hinges 125 and 127. Accordingly, the locking element 32 and the base member 16 are preferably made from a resilient plastic. Although living hinges 125 and 127 are disclosed, other hinge devices could be used, possibly in conjunction with springs, to enable a resilient connection between the locking element 32 and the base member 16.

A stop 126 projects into the first base channel 104 at the stopping end 88 of the base member 16 to prohibit the top member 14 from sliding beyond face 128 of the stopping end 88 of the base member 16.

The second base flange 30 extends in a manner similar to the first base flange 28. The second base flange 30 extends perpendicular to the platform 90 and has a rib 130 at the end remote from the platform 90. The rib 30 extends perpendicular to the second flange 94. A second base channel 131 is formed between the second base rib 130 and the platform 90. The second base channel 131 is sized to receive second top rib 48. The ribs and channels of the top and base members 14 and 16 engage as shown in FIG. 7 to allow for axial sliding when the locking elements 26 and 32 are disengaged while preventing separation perpendicular to the longitudinal axis.

Similar to the first base rib 102, the second base rib 130 has three sections, a first receiving end section 134, a second concave section 136, and a third section 138 adjacent the stopping end 88 of the base member 16. All three rib sections 134, 136 and 138 of the second flange 30 are located opposite the three rib sections 106, 108 and 110 of the first flange 28 respectively. As seen in FIG. 5 the first rib section 134 of the second flange 30 is identical to the third rib section 110 of the first flange 28. The second rib sections 108 and 136 of the first and second flanges 28 and 30 are identical, and the third rib section 138 of the second flange 30 is identical to the locking rib section 106 of the first flange 28.

Three additional through slots 101 exist in the platform 90 opposite the second flange rib sections 134, 136 and 138. The perimeter of the additional through slots 101 is shown in FIG. 5. The additional through slots 101 adjacent the second flange 30 are aligned with and below those rib sections 134, 136 and 138 in the same manner that the through slots 100 adjacent the first flange 28 are aligned with and below the first flange rib sections 106, 108 and 110. The through slots 101 adjacent rib sections 134 and 136, and the through slots 100 adjacent rib sections 108 and 110 are identical in horizontal shape along the platform 90. FIG. 6 shows the horizontal width of through slots 100 and 101.

Second base flange 30 also has a stop element 140 similar to stop element 126 of the first base flange 28. The stop element 140 of the second base flange 30 extends into the second base channel 131 to likewise limit relative movement between the top member 14 and the base member 16.

The attachment portion 96 extends from a lower side 142 of the platform 90 and includes a seat 144 for the fastener head 72 and an aperture 146 for the fastener neck 148 as shown in FIGS. 7 and 8. The aperture 146 is circular and the seat 144 has recessed sides 150 which conform to the fastener head 72.

Adjacent the attachment portion 96 are two stiffeners 98 which extend from opposite sides of the attachment portion 96 to the opposite ends 86 and 88 of the base member 16 and to the platform 90 as shown in FIG. 3. These stiffeners 98 further strengthen the trolley assembly 10.

Each stiffener 98 has a stiffener hole 152 extending therethrough. The platform 90 has two through slots 154 adjacent these stiffener holes 152 as shown in FIG. 5 to facilitate manufacturing.

The fastener 34, received within the seat 144 of the support attachment portion 96, has a head 72 mating with the seat 144 as shown in FIG. 7, and a neck 148 protruding through a hole 146 sufficient to receive a supporting bracket 36 as seen in FIGS. 1 and 2. A threaded hole 156 in the fastener 34 receives a screw 37 shown in FIG. 6 which secures the bracket 36 to the trolley 10.

As shown in FIGS. 1 and 2, the bracket 36 is generally an assembly having concave surfaces for holding cords or hoses. A lower winged element 158 and an upper winged element 160, each having concave surfaces 162, are attached by multiple bolts 164 for varying the distance between the winged elements 158 and 160. The bracket 36 is thus adjustable for various conduit thicknesses.

Other supports can be easily attached to the trolley 10 depending on the desired use of the trolley 10. For instance, the supports can comprise various configurations (not shown) of the bracket 36 to support various sized hoses, wires, cables, and the like. The support attachment can also comprise hooks instead of brackets for supporting tools. Additionally, the support attachment can have accessories such as hydraulic hose fittings attached thereto.

The fasteners used to support the bracket can be any known fastener which suitably holds the weight of the element supported.

The fastener 34 and the supporting bracket 36 are preferably made from metal. The top member 14 and base member 16 of the trolley 10, and all of their respective elements are formed from hard polymeric material which is relatively stiff but sufficiently resilient to allow the base locking element 32 to be biased away from the top locking element 26 and return to its original position. The top member 14 is preferably a one-piece member except for the rollers 78 and axes 80. The base member 16 is also preferably a one-piece member.

Assembly

The trolley 10 is assembled on the support line 12 by first placing the support line in the U-shaped recess 39 of the top member 14, and in the U-shaped recess 33 in the base member 16. Therefore, when the two members 14 and 16 are brought together as described below, the support line 12 extends within the through passageway 76. During assembly of the two members 14 and 16, the inserting end 40 of the top member 14 is first aligned with the receiving end 86 of the base member 16 as seen in FIG. 2. The ribs 46 and 48 of the top member 14 are then inserted into the channels 104 and 131 of the base member 16 while the ribs 102 and 130 of the base member are inserted into the channels 50 and 52 of the top member 14.

As the top and base members 14 and 16 are slidably engaged, the inserting end 40 of the top member 14 becomes closer to the stopping end 88 of the base member 16. The locking element 32 of the base member 16 likewise becomes closer to the locking element 26 of the top member 14.

When the locking elements 26 and 32 come into initial contact, the ramp 56 of the wedge 26 contacts the bevelled surface 118 of the first abutment 112 of the locking rib 106. Upon applying additional force, the resilient locking element 32 of the base member will be displaced outwardly so that the first abutment member 112 can proceed along the ramp 56. With continuing force applied to the top member 14, the first abutment member 112 travels up and off the ramp 56 as the top element 14 is inserted further along the base element 16.

A snap-fit engagement is thus formed as the first abutment member 112 passes beyond the surface of ramp 56 and the resilient nature of the base locking element 32 forces the first abutment 112 to once again move back to its original position adjacent and in front of the front 58 of the wedge 26. Once this snap-fit has occurred, the ends 40 and 88 and the ends 42 and 86 of the top and base members 14 and 16 are flush with each other as shown in FIG. 3. The top and base members 14 and 16 are now fully locked and engaged.

As shown in FIG. 7, the channels 50 and 52 of the top member 14 completely mate with the ribs 102 and 130 of the base member 16, and likewise the channels 104 and 131 of the base member 16 completely mate with the ribs 46 and 48 of the top member 14. Thus, relative transverse movement of the top and base members is resisted.

Disassembly

Once the trolley 10 is assembled on the support line 12, it moves freely along the support line 12 through the use of rollers 78. To disassemble the trolley 10 and remove it from the support line 12, the top member 14 and the base member 16 must be separated. This is accomplished by inserting a tool 62, such as a screwdriver, into the releasing opening 166 as shown in FIG. 9. The releasing opening 166 is formed when the top and base members are engaged as shown in FIGS. 1 and 6.

As shown in FIG. 9, the tool 62 is positioned in a manner allowing it to be pivoted in a counter clockwise direction (as shown by the arrow) to outwardly displace the resilient locking element 32 of the base member 16 as seen in FIG. 10.

FIG. 10 shows the point at which the tool 62 has been pivoted counter clockwise against the releasing block 64 and an edge of locking element 32 and has pivoted the resilient locking element 32 out of its initial position. The first abutment 112 of locking element 32 has been moved away from the first top flange 22 along the front 58 of the wedge 26 to a point at which the wedge 26 can now be removed from its previous position within the recess 116 of the base locking element 32. The tool 62 pivots the resilient locking element 32 away from the wedge 26 so that the first abutment 112 no longer stops the top member 14 from being slidably removed from its engagement with the base member 16.

As shown in FIG. 11, the top and base members have longitudinally slided relative to one another and the wedge 26 has been displaced to a position beyond the first abutment 112 such that the first abutment 112 has now travelled down the surface of ramp 56 to its initial position. Further pivoting of the tool 62 in the counter clockwise direction against the locking element 32 of the base member 16 forces the top member 14 to be slided along the base member 16 in a direction opposite to the direction of assembly. The inserting end 40 of the top member 14 is forced further away from the stopping end 88 of the base member 16.

The locking end 42 of the top member 14 can now be further pulled away from the receiving end 86 of the base member 16. In doing so, the members 14 and 16 slidably disengage. At the point when the inserting end 40 of the top member 14 has passed through the receiving end 86 of the base member 16, the two elements 14 and 16 are separated. The trolley 10 can then be removed from the support line 12. Once removed, the trolley 10 may be positioned on another support line and reassembled or simply reassembled apart from any support line for storage. The reassembly occurs in the same manner as described above with regard to the initial assembly.

While a particular embodiment has been chosen to illustrate the invention, it will be understood by those skilled in the art that various changes and modifications can be made therein without departing from the scope of the invention as defined in the appended claims.

What is claimed is:

1. A trolley comprising:

a top member having a longitudinal axis and a top connecting portion with a top locking element; and a base member having a base connecting portion for slidably engaging with said top connecting portion in a direction substantially parallel to said longitudinal axis, said base connecting portion having a base locking element releasably engaging said top locking element for releasably locking said top member to said base member, said base member further having a portion for attaching a holding device, said top and base members defining a through passageway for receiving an elongated support therein, said through passageway extending lengthwise, substantially parallel to said longitudinal axis.

2. The trolley according to claim 1, wherein said trolley has means for facilitating movement of said trolley along said elongated support, and said top and base connecting portions are flanges extending from each of said top and base members.

3. The trolley according to claim 2, wherein said top connecting portion flanges comprise a first top flange with a first top rib, and a second top flange with a second top rib, and said base connection portion flanges comprise a first base flange with a first base rib, and a second base flange with a second base rib.

4. The trolley according to claim 3, wherein said first and second top flanges and said first and second base flanges extend substantially parallel to said longitudinal axis, said first and second top ribs and said first and second base ribs extend substantially perpendicular to said first and second top flanges and said fast and second base flanges, respectively, and first and second top channels are formed between a lower surface of said top member and said first and second top ribs, respectively, and first and second base channels are formed between an upper surface of said base member and said first and second base ribs, respectively.

5. The trolley according to claim 4, wherein said first and second top ribs are slidably received in said first and second base channels, respectively, and said first and second base ribs are slidably received within said first and second top channels, respectively.

6. The trolley according to claim 2, wherein said means for facilitating movement of the trolley is at least one roller.

7. The trolley according to claim 6, wherein said means for facilitating movement of the trolley comprises at least one roller aligned parallel to said longitudinal axis.

8. A trolley comprising:

a top member having a top connecting portion with a top locking element; and a base member having a base connecting portion for slidably engaging with said top connecting portion, said base connecting portion having a base locking element releasably engaging said top locking element for releasably locking said top member to said base member, said base member further having a portion for attaching a holding device, said top and base members defining a through passageway for receiving an elongated support therein, said trolley having means for facilitating movement of said trolley along said elongated support, and said top and base connecting portions being flanges extending from each of said top and base members, said top connecting portion flanges comprising a first top flange with a first top rib, and a second top flange with a second top rib, and said base connection portion flanges comprising a first base flange with a first base rib, and a second base flange with a second base rib, said top member having a longitudinal axis, said through passageway extending substantially parallel to said longitudinal axis, said first and second top flanges and said first and second base flanges extending substantially parallel to said longitudinal axis, said first and second top ribs and said first and second base ribs extending substantially perpendicular to said first and second top flanges and said first and second base flanges, respectively, and first and second top channels being formed between a lower surface of said top member and said first and second top ribs, respectively, and first and second base channels being formed between an upper surface of said base member and said first and second base ribs, respectively, said first and second top ribs being slidably received in said first and second base channels, respectively, and said first and second base ribs being slidably received within said first and second top channels, respectively, said top locking element being located within said first top channel, and said base locking element comprising a portion of said first base rib.

9. The trolley according to claim 8, wherein said top connecting portion further includes a top releasing element located within said first top channel.

10. The trolley according to claim 9 wherein said base member has a stop element projecting into one of said first and second base channels and engaging one of said top ribs.

11. A trolley comprising:

a top member having a top connecting portion with a surface, a top locking element and a top releasing element spaced from said top locking element, said top locking element and said top releasing element being located on said surface; and a base member having a base connecting portion with a base locking element, said base locking element providing a resilient abutment for releasably engaging said top locking element for releasably locking said top member to said base member, said base member further having a portion for attaching a holding device, said top and base members defining a through passageway for receiving an elongated support therein.

12. The trolley according to claim 11, wherein said top connecting portion is a flange extending from said top member.

13. The trolley according to claim 11, wherein said trolley has means for facilitating movement of said trolley along said elongated support.

14. The trolley according to claim 11, wherein said portion for attaching a holding device comprises a lower section with an opening therethrough; and said trolley further comprises a fastener in said opening.

15. The trolley according to claim 14, wherein said fastener is connected to a bracket.

16. A trolley comprising:

a top member having a top connecting portion with a top locking element; and a base member having a base connecting portion with a base locking element, said base locking element providing a resilient abutment for releasably engaging said top locking element for releasably locking said top member to said base member, said base member further having a portion for attaching a holding device, said top and base members defining a through passageway for receiving an elongated support therein, said top connecting portion further including a top releasing element, said top locking element being a wedge, and said top releasing element being a slot for receiving a tool.

17. A trolley comprising:

a top member having a top connecting portion with a top locking element; and a base member having a base connecting portion with a base locking element, said base locking element providing a resilient abutment for releasably engaging said top locking element for releasably locking said top member to said base member, said base member further having a portion for attaching a holding device, said top and base members defining a through passageway for receiving an elongated support therein, said base locking element being hingedly coupled to a main section of said base connecting portion by a hinge.

18. The trolley according to claim 18, wherein said hinge is a living hinge.

19. The trolley according to claim 17, wherein said base locking element comprises an area for receiving said top locking element, said area being located between two spaced abutments.

20. The trolley according to claim 17, wherein said base locking element is separated from said main section of said base connecting portion by a notch.

21. The trolley according to claim 17, wherein said base member further comprises a relief aperture through a platform adjacent said base locking element.

* * * * *